Figure 1:
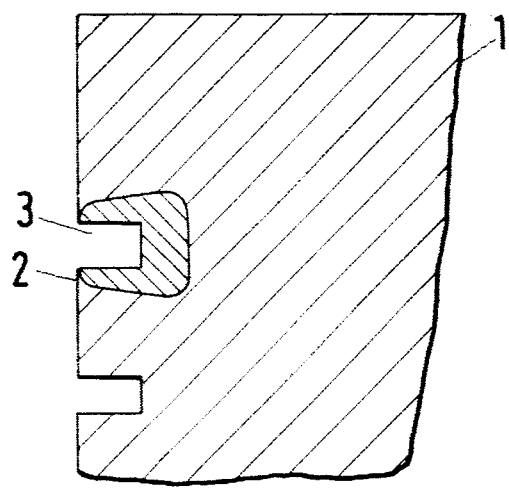

United States Patent [19]

Mielke et al.

[11] Patent Number: 5,119,777
[45] Date of Patent: Jun. 9, 1992

[54] LIGHT ALLOY PISTON

[75] Inventors: Stegfried Mielke, Neckarsulm; Wolfgang Henning, Obersulm, both of Fed. Rep. of Germany

[73] Assignee: Kolbenschmidt Aktiengesellschaft, Neckarsulm, Fed. Rep. of Germany

[21] Appl. No.: 666,295

[22] Filed: Mar. 8, 1991

[30] Foreign Application Priority Data

Mar. 31, 1990 [DE] Fed. Rep. of Germany ....... 4010474

[51] Int. Cl.$^5$ .................. F02F 3/08; C22C 37/00; B23P 15/10
[52] U.S. Cl. .................. 123/193.6; 29/888.046; 29/888.047
[58] Field of Search .............. 123/193 P; 92/222, 224; 29/888.04, 888.046, 888.047; 164/120

[56] References Cited

U.S. PATENT DOCUMENTS

| | | | |
|---|---|---|---|
| 3,533,329 | 10/1970 | Galli | 29/888.047 |
| 4,008,051 | 2/1977 | Cadle | 123/193 P |
| 4,498,219 | 2/1985 | Ban et al. | 29/888.046 |
| 4,651,631 | 3/1987 | Avezou | 29/888.046 |
| 4,829,883 | 5/1989 | Raggi | 123/193 P |
| 4,987,867 | 1/1991 | Suzuki et al. | 123/193 P |

Primary Examiner—E. Rollins Cross
Assistant Examiner—M. Macy
Attorney, Agent, or Firm—Sprung Horn Kramer & Woods

[57] ABSTRACT

In a pressure-diecast light alloy piston, a ring carrier made of a metallic material having pores filled by the piston materials is embedded in the piston casting adjacent to the first ring groove. In order to provide a strong joint to the piston base body, the ring carrier consists of cold-compacted chips of austenitic cast iron and there is a metallic bond between the chips and the piston material.

9 Claims, 1 Drawing Sheet

U.S. Patent
June 9, 1992
5,119,777

LIGHT ALLOY PISTON

DESCRIPTION

This invention relates to a pressure-diecast light alloy piston for internal combustion engines, particularly for diesel engines, comprising a ring carrier, which is embedded in and bonded to the cast base body of the piston adjacent to the first ring groove and optionally also to the second ring groove and is made of a metallic material, which has pores that are filled with the piston material, and said ring carrier is formed with the cut-in ring groove.

In order to meet the requirements for low fuel consumption, the means effective pressure of diesel engines for commercial automobiles has steadily been increased in recent years. Such engines must be designed for high continuous loads and the critical portions of their pistons must withstand the elevated operating temperatures which occur under such high continuous loads. The light alloy pistons which are presently available for such applications comprise a ring carrier, which is made of a special austenitic cast material and is embedded in and metallically bonded to the cast base body of the piston adjacent to the first ring groove, optionally also adjacent to the second ring groove. Because the cast iron material has approximately the same thermal expansion as the light alloy material, only comparatively low thermal stresses will arise and this will promote the formation of a good bond (Technisches Handbuch, Karl Schmidt GmbH, Neckarsulm, 1967, pages 106 to 109). The ring groove is not cut into the ring carrier until it has been embedded in the casting. The piston ring lies in the wear-resisting material and will be subjected to relatively lower temperatures. A strong and gastight joint must be provided between the ring carrier and the piston material and improved heat transfer must be permitted.

The requirement for the provision of a first ring groove which has a high resistance wear and for simultaneous utilization of the high strength of the material used in a light alloy piston that has been made by hot extruding has led to a piston which has a pressed-in ring carrier. The ring carrier which is made of austenitic modular cast iron has a strongly fissured skin formed with numerous irregular undercut voids, which are required to be completely filled with the piston material so that they are inseparably joined to the piston base body (DE-B-1 224 109). Owing to inadequate hardness, that ring carrier is subject to considerable wear.

DE-A-3 801 847 discloses a process of manufacturing light alloy pistons for internal combustion machines, which pistons comprise a ring carrier, which is embedded in the piston casting adjacent to at least the first ring groove. In that process a ring carrier which is made of a material consisting of austenitic sintered iron and formed with open pores is heated to 400° to 750° C. and placed into a mold that has been preheated to 200° to 400° C., a certain aount of a molten aluminum alloy is poured into the mold and is pressurized until it has solidified, whereby the pressurized material is caused to flow around the ring carrier and to fill the piston mold and also the open pores of the ring carrier. It is intended in this manner to provide a particularly strong joint between the ring carrier and the piston base body, which in itself will withstand very high loads in the engine so that the risk of an occurrence of undesired cracks or even fractures adjacent to the joint between the ring carrier and the piston will virtually entirely be eliminated. However, it has been found that the ring carrier has a relatively low strength because it has been made by sintering.

It is an object of the present invention to provide a ring carrier piston which is of the kind described hereinbefore and in which the ring carrier is joined to the piston base body by a joint which is inseparable even under prolonged action of heat and which is gastight and oil pressure-tight. The ring carrier is also required to have high strength.

That object is accomplished by the provision of a ring carrier, which is made of cold-compacted chips of austentic cast iron material and in which the free surfaces of the chips are joined to the piston material by a metallic bond. The cast iron material is provided with a relatively thick intermetallic layer. In addition the graphite flakes contained in the cast iron material will provide good emergency running properties owing to their lubricating effect.

The chips are made of an austenitic cast iron that contains graphite flakes (grey iron) and, is composed of 1.0 to 2.8% by weight silicon
0.8 to 1.5% by weight manganese
13.5 to 22.0% by weight nickel
1.75 to 6.0% by weight chromium
up to 0.5% by weight copper
up to 3.0% by weight carbon
up to 0.8% by weight phosphorus
balance iron.

That alloy may alternatively have a copper content of 5.5 to 7.5% by weight.

Alternatively the chips may be made of an austenitic nodular cast iron material which is composed of 1.75 to 3.0% by weight silicon
0.7 to 2.4% by weight manganese
18.0 to 24.0% by weight nickel
up to 0.5% by weight chromium
up to 3.0% by weight carbon
up to 0.08% by weight phosphorus
balance iron.

According to a further feature of the invention the chips made of austenitic special cast iron can be replaced entirely or in part by chips made of high-silicon aluminum alloys, fiber-reinforced aluminum alloys and non-ferrous heavy metals, individually or in combination.

It has been found desirable to admix up to 5% by volume zinc powder having a particle size of 40 to 100 $\mu$m with the chips in order to effect a uniform wetting of the chips.

In the process of manufacturing the light alloy pistons designed in accordance with the invention the cleaned and degreased chips which have a size of 1 to 10 mm, preferably 2 to 5 mm, are compacted under a pressure of 350 to 800 N/mm$^2$ to form a ring carrier, which is subsequently heated for 5 to 30 minutes, preferably 10 to 15 minutes, in molten aluminum or molten aluminum-silicon at 700° to 750° C. and after it has been taken from the molten material is placed into a piston mold, which is then filled with molten piston material, which is caused to solidify under a pressure of preferably 500 to 1000 bars.

The thickness of the intermetallic layer existing between the free surfaces of the chips and the piston material amounts to about 0.015 to 0.030 mm on the outside surface of the ring carrier and to less than 10 $\mu$m, preferably to 2 to 5 μm, in the interior. In case of dipping into pure aluminum the composition of that layer will correspond to the intermetallic phase $Fe_2Al_5$ and it will have a more complex composition if aluminum alloys are used.

The strength of the bond between the ring carrier and the piston material is about twice the strength obtained if a ring carrier is used which has open pores and is only mechanically anchored to the piston material. In addition, the matallic bond has a high resistance to thermal shock and is gastight and oil pressure-tight.

Figure 2:

An example of the invention will be explained hereinbelow with reference to the accompanying drawings, wherein:

FIG. 1 is a fragmentary view showing a light alloy piston in a longitudinal sectional view on a place which contains the axis of the piston; and FIG. 2 shows in a magnification of 500:1 a polished section of a portion of a radial sectional plane through the piston adjacent to the ring carrier.

Refering now more particularly to FIG. 1, there is shown a light alloy piston 1. Adjacent to a first ring groove 3 a ring carrier 2 is embedded in the piston casting and the webs of the ring carrier are covered on their end faces by the piston material. The ring carrier 2 has been formed by machining with the ring groove 3. The ring carrier 2 consists of chips 4, which have an average length of 4 mm and have been compacted under a pressure of 480N/mm$^2$ and are made of an austenitic nodular cast iron material composed of 2.0% by weight silicon
0.85% by weight manganese
19% by weight nickel
1.95% by weight chromium
1.5% by weight carbon
balance iron.

As seen in FIG. 2, the ring carrier 2 is perfectly embedded in the piston casting. A good intermetallic bonding layer 5 having a thickness of 0.015 to 0.030 mm is provided on the outside surfaces of the ring carrier 2. Throughout the cross-section the open voids 6 of the ring carrier 2 have snugly been penetrated by the material of the piston body 7 or are filled by the intermetallic bonding layer 5.

It will be understood that the specification and examples are illustrative but not limitative of the present invention and that other embodiments within the spirit and scope of the invention will suggest themselves to those skilled in the art.

What is claimed is:

1. In a pressure-diecast light alloy piston for an internal combustion engine comprising a ring carrier which is embedded in and bonded to the cast base body of the piston adjacent to a first ring groove and optionally also to a second ring grooves and is made of a metallic material, and which has pores that are filled with the piston material (1), the improvement wherein the ring carrier (2) is made of cleaned and degreased cold-compacted chips (4) and the free surfaces of the chips are joined to the piston material (1) by a metallic bond, the chips being made of at least one member selected from the group consisting of austenitic cast iron, a high-silicon aluminum alloy, a fiber-reinforced aluminum alloy and a non-ferrous heavy metal.

2. A light alloy piston according to claim 1, wherein the chips (4) are made of an austenitic grey cast iron that contains graphite flakes and comprises approximately 1.0 to 2.8 % by weight silicon
0.8 to 1.5% by weight manganese
13.5 to 22.0% by weight nickel
1.75 to 6.0% by weight chromium
up to 3.0% by weight carbon
up to 7.5% by weight copper
up to 0.8% by weight phosphorus balance iron.

3. A light alloy piston according to claim 2, wherein the copper content amounts to 5.5 to 7.5% by weight.

4. A light alloy piston according to claim 2, wherein the copper content amounts to up to 0.5% by weight.

5. A light alloy piston according to claim 1, wherein the chips (4) are made of an austenitic nodular cast iron material approximately comprising 1.75 to 3.0% by weight silicon
0.7 to 2.4% by weight manganese
18.0 to 24.0% by weight nickel
up to 0.5% by weight chromium
up to 3.0% by weight carbon
up to 0.08% by weight phosphorus balance iron.

6. A light alloy piston according to claim 1, wherein the chips (4) comprise at least one member selected from the group consisting of a high-silicon aluminum alloy, a fiber-reinforced aluminum alloy and a non-ferrous heavy metal.

7. A light alloy piston according to claim 1, wherein the chips (4) comprise austenitic cast iron.

8. A light alloy piston according to claim 1, wherein the ring carrier contains up to 5% by volume zinc powder having a particle size of 40 to 100 μm and admixed with the chips (4).

9. A light alloy piston according to claim 1, which is produced by cleaning and degreasing chips having a size of 1 to 10 mm, cold-compacting the chips under a pressure of 400 to 600 N/mm$^2$ to form a ring carrier, heating the ring carrier for 5 to 30 minutes in molten aluminum or molten aluminum-silicon at 700° to 750° C., removing the ring carrier from said molten material and placing it into a piston mold, filling molten piston material into said mold, and solidfying the molten material under a pressure of 500 to 1000 bars.

* * * * *

UNITED STATES PATENT AND TRADEMARK OFFICE
CERTIFICATE OF CORRECTION

PATENT NO. : 5,119,777
DATED : June 9, 1992
INVENTOR(S) : Mielke et al.

It is certified that error appears in the above-identified patent and that said Letters Patent is hereby corrected as shown below:

Title Page,        [75] Inventors:  1st Inventor delete
                   " Stegfried " and substitute -- Siegfried --

Col. 3, last line  Delete " grooves " and substitute
                   -- groove --

Signed and Sealed this

Fifth Day of April, 1994

Attest:

BRUCE LEHMAN

Attesting Officer        Commissioner of Patents and Trademarks